FIG. IA.

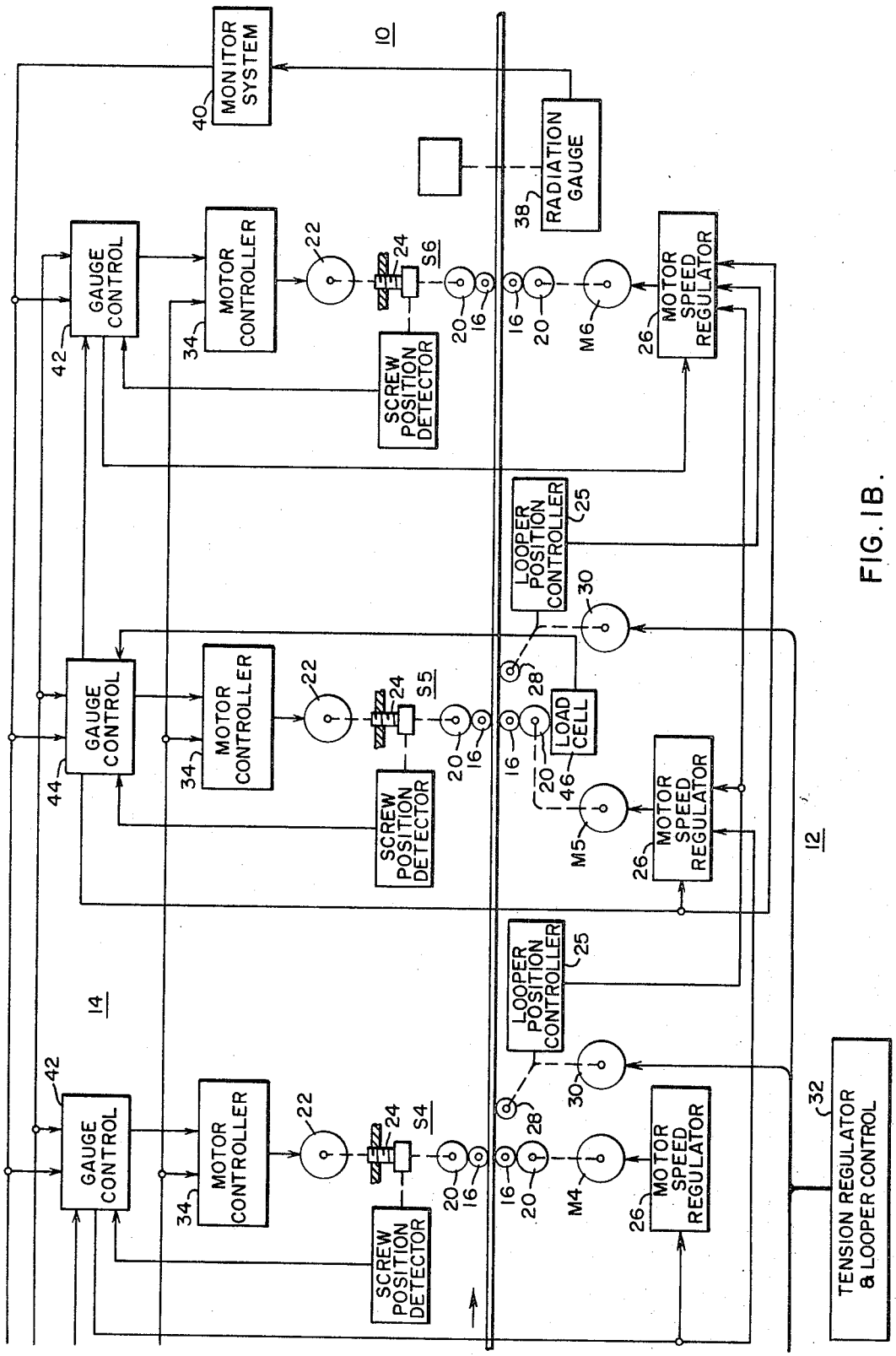
FIG. IB.

United States Patent Office 3,357,217
Patented Dec. 12, 1967

3,357,217
SLAVE GAUGE CONTROL SYSTEM FOR A
ROLLING MILL
John W. Wallace, Williamsville, N.Y., assignor to Westinghouse Electric Corporation, Pittsburgh, Pa., a corporation of Pennsylvania
Filed May 12, 1965, Ser. No. 455,111
14 Claims. (Cl. 72—8)

ABSTRACT OF THE DISCLOSURE

A rolling mill has a plurality of tandem screwdown controlled roll stands. At least one of the roll stands is operated as a slave to a previous master stand. To effect the master-slave relation, a roll force dependent signal is obtained from the master stand and transmitted to a control which positions the slave stand screws.

Background of the invention

The present invention relates to workpiece strip gauge control systems for rolling mills and more particularly to strip gauge control systems which control strip gauge with improved stability in hot strip metal rolling mills.

Gauge or thickness of strip is, for commercial and economy reasons, desirably held within a narrow and predetermined tolerance range as it is delivered from a reduction rolling mill. In the specific case of hot strip steel rolling mills, the mill comprises a plurality of roll stands connected in tandem to reduce an entry slab by successive reductions to a delivery strip of desired gauge. A radiation or X-ray gauge usually is used to monitor the delivery thickness and provide, normally on a time sampling basis, gauge correction or error signals to the gauge control system. Since the working thickness of hot steel strip is usually relatively large, roll force gauge control, as generally disclosed in U.S. Patent 2,726,541 by R. B. Sims, has been proved suitable for use as the basic gauge correcting scheme particularly for the early stands in most hot strip mill installations.

The roll force gauge control can be connected as a subsystem at each mill stand but often is only connected at each of a few preselected mill stands. Generally, each roll force subsystem controls the roll opening at its particular stand thereby to control the resulting strip reduction, since growback after rolling is normally negligible. The radiation or X-ray monitor system is usually tied to one or more of the roll force subsystems to provide steady state gauge control in relation to a fixed reference since the roll force subsystems are substantially limited to transient gauge changes from a floating set point or reference. Strip tension can be controlled by the roll force control or by other well known means so as to correct or aid in correcting the strip gauge, but in hot strip mills the strip tension is usually only held within a relatively limited and narrow range of values which are conductive to proper flow of the strip through the rolls substantially without strip width reduction.

The roll force gauge control operates on the principle that an elastic separating force is produced on the rolls as the strip is reduced through plastic deformation. Thus, a change in gauge is accompanied by a change in force on the rolls, and the roll opening is changed in accordance with the stretch or mill spring characteristics of the rolls and the stand structure. The screwdown pressure on the rolls must be changed to produce the roll force required to maintain a constant roll opening and corresponding gauge constancy.

The roll force principle is summarized by the following most commonly used formula:

$$dh = MdF + dS$$

where:

$dh$ = change in thickness
$M$ = mill spring constant
$dF$ = change in roll force from a reference value
$dS$ = change in screw position from original setting Signals corresponding to $MdF$ and $dS$ are generated and summed, and with proper signal calibration and polarity, substantially constant gauge can be held by controlling the screw position so that the roll force and screw position quantities add to zero.

Although the roll force principle has been embodied in control apparatus for numerous rolling mills, the maintenance of gauge control stability under varying use conditions is a persisting difficulty with which installers and operators are confronted. It is desirable that stand gauge error be rapidly and fully corrected but not overcorrected at any particular stand having roll force gauge control, and error correction should be achieved without screw runaway which occurs when the screw movement produces a signal incapable of matching the roll force error signal, i.e. when the roll force signal changes at a faster rate than the screw position signal does—noting that screw movement produces additional change in the roll force.

In control terminology, it is desirable to tune the roll force gauge control at 100% gain so as to produce precise screw movement for full gauge error correction. Any lower gain results in gauge undercorrection and higher gain results in undesirable overcorrection or in screw runaway. A limit switch usually prevents excessive runaway and holds the roll force gauge control within a predetermined operating range. However, it is permissible and sometimes desirable to overtune the gain at about 110% or so when the expected temperature rundown of the hot strip allows for anticipatory gauge error correction. On the other hand, overtuning nearly always results in screw runaway at some stage in the mill operation as differently characterized strips are rolled.

The difficulty in gain adjustment exists for several apparent reasons but is due principally to a single problem source. It is that the mill spring constant $M$ is not in fact a constant. Empirically, the spring constant $M$ has been determined to vary at least as much as 10% for the same mill stand during operation. The variance in the spring "constant" is believed to be due to such variables as roll axial bending which varies with strip width, roll heating, roll flattening, and roll bite angle. Thus, a mill operator may note that the roll force gauge control subsystems are operating stably with a flow of particular metal strip, yet he may perceive excessive gauge control instability or screw runaway when he rolls a new and succeeding strip having changed width or changed metallurgy or other changed characteristics, or when some other variable changes without his awareness. To offset the gauge overcorrection or screw runaway, the gain settings must be readjusted under the new conditions. On the other hand, excessive gauge control instability and screw instability can be largely avoided by conservatively tuning the gain, at say 80%, at the expense of producing off gauge material.

Summary of the invention

In accordance with the principles of the present invention, gauge control stability is materially improved and screw runaway is largely avoided in a wide variety of rolling mill used conditions without sacrificing the gauge accuracy of the rolled strip. Improved gauge control stability and other improvements are achieved in any particular mill setup by means of a slave stand which is provided with a gauge control or screw position control system to which a portion of a suitable roll force dependent signal is transmitted from a previous master stand preferably equipped with a roll force gauge control subsystem. A plurality of master and slave stands can be used, and if desired the master and slave stands can be plurally interconnected for interstand error signal transmission. The use of particular stands as slave stands can provide special advantages. The employment of one or more slave stands also generally provides gauge correction for detected but uncorrected off gauge strip from a previous master stand. A similar anticipatory foundation is made for correction of previously uncorrected rapid gauge errors such as those due to furnace skid marks on the metal strip.

It is therefore an object of the invention to provide a novel and improved gauge control system for a rolling mill which operates with better gauge control stability and accuracy.

Another object of the invention is to provide a novel roll force gauge control system for a rolling mill which can be tuned at 100% or more gain to achieve full gauge correction with improved gauge control stability and substantially without or with less screw runaway as the mill spring constant changes in the various stands as a result of new strip or other new operating conditions.

An additional object of the invention is to provide a novel roll force gauge control system for a rolling mill in which a roll force error signal from at least one master stand is transmitted to at least one subsequent stand so as to provide better anticipatory correction of off gauge strip portions or rapid gauge errors detected but uncorrected at the master stand.

A further object of the invention is to provide a novel gauge control system for a rolling mill in which at the least the last major reduction stand is made a slave stand to a previous master stand so as to compensate better for growback in the last stands and thereby relieve the monitor system from this function.

It is another object of the invention to provide a novel gauge control system for a rolling mill in which at least one stand is slave connected to the next previous stand so as to receive a gauge correction signal thereby better preventing the rolls of the slave and master stands from moving in opposite directions when conditions warrant identically directed movement.

It is a further object of the invention to provide an economical scheme for improving the operation of gauge control systems of existing installations in which fewer than all of the stands are provided with a roll force gauge control subsystem.

These and other objects of the invention will become more apparent upon consideration of the following detailed description along with the attached drawings.

*Description of the preferred embodiment*

Figure 1:
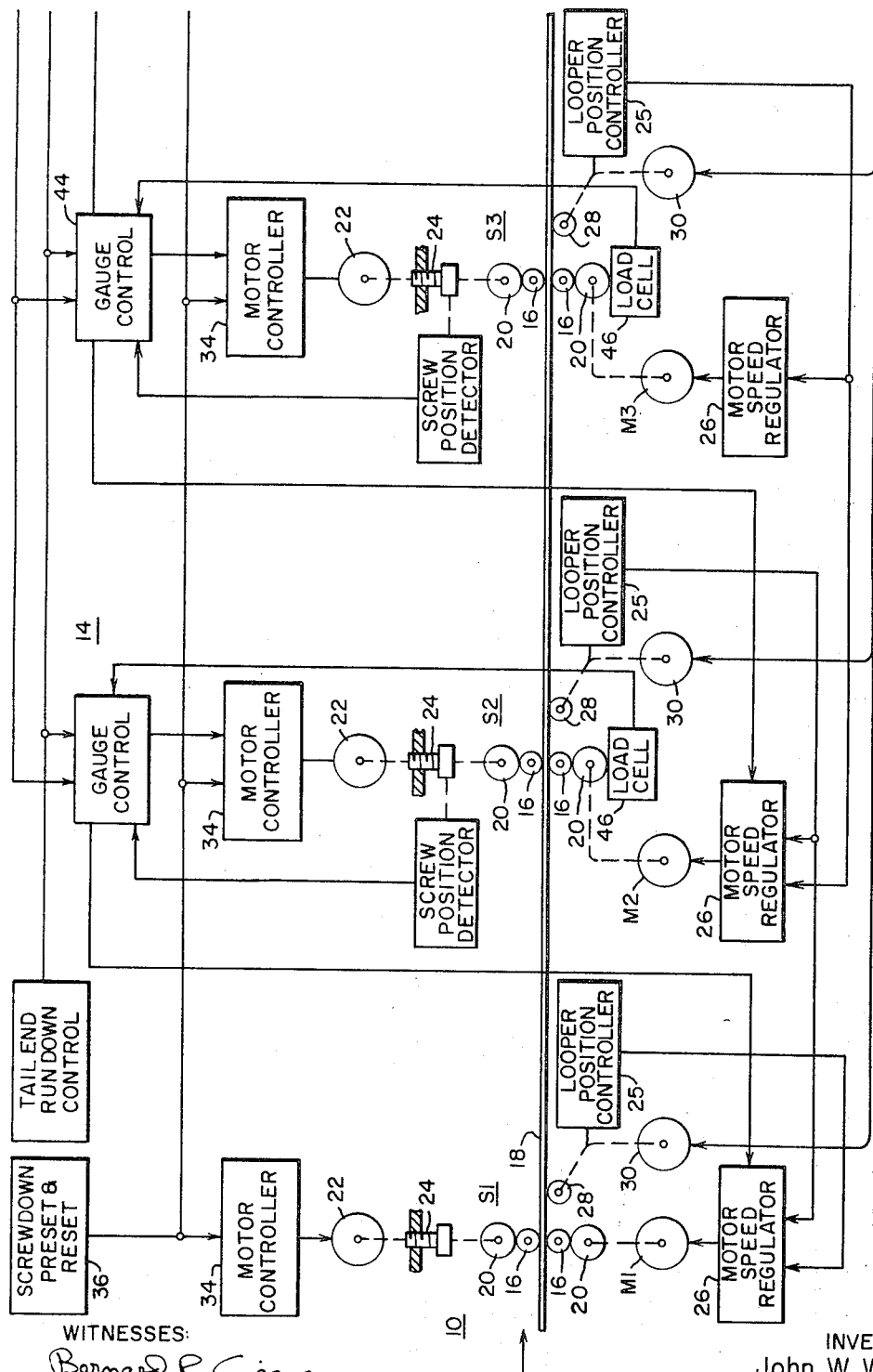
FIGURES 1a and 1b taken together show a schematic view of a hot strip rolling mill in which the present invention is incorporated.

In FIG. 1, there is schematically shown a rolling mill 10 provided with a control system 12 including a roll force gauge control system 14 arranged in accordance with the principles of the invention. The mill 10 is a tandem hot strip finishing train steel mill, for which the invention is especially adapted. However, the invention can be embodied in other well known types of steel mills and it can be embodied in mills which roll materials other than steel. The mill 10 and the control system 12 are shown to indicate a suitable environment for the present invention, and they are shown in schematic form in order to simplify the drawings and clarify the invention disclosure particularly in view of the fact that many of the mill and control components and subsystems are well known per se in the art or can be formed from numerous well known functionally equivalent circuits or elements.

The mill 10 is provided with six roll stands S1 through S6, although a lesser or greater number of stands can be employed. Each stand is provided with opposed rolls 16 between which hot steel strip 18 is guided for gauge reduction. Back up rolls 20 on each stand provide the roll force needed to reduce the strip 18 in thickness as it passes between the rolls 16. A pair of screwdown motors 22 (only one is shown) operate a pair of screws 24 (only one is shown) at each stand to control the force applied to opposite ends of the back up rolls 20 and thereby affect the size of the opening through which the strip 18 passes between the rolls 16. The strip 18 begins as a bar at the entry to the first stand S1 and is successively reduced as it passes through the stands S2–S5. When the strip is delivered from the last stand S6 to a coiler (not shown), it is rolled in finished form with substantially uniform gauge throughout its length.

Motors M1–M6 are coupled to the back up rolls 20 at the respective stands S1–S6 to drive the mill. As the strip 18 moves from one stand to the next, its speed must be increased to make up for the increased length resulting from gauge reduction. A speed or voltage regulator 26 is thus generally provided for each drive motor, and if desired all of the regulators 26 can be coupled to a master regulator (not shown) so as to control the overall mill speed. The entire mill 10 can thereby be accelerated to a run speed of 4000 FPM for example after the strip 18 has been threaded, at a thread speed of 2000 FPM for example, on the previously described coiler.

It is desirable that strip tension at the roll interface be held within a predetermined range since tension can be a significant determinant of gauge and width reduction and, in turn, the extent to which gauge error must be corrected by the roll force gauge control system 14. As is well known in the art, a looper 28 is thus positioned between each pair of stands and its position is controlled by a looper motor 30 operated by a tension regulator and looper control system 32. The looper 28 can instead include a hydraulic motor (not shown) which is preset to lift the strip 18 at the interstand location to an extent determined by the downward pull on the strip from the rolls 16. In either case, a looper position controller 25 transmits a control signal to the drive motor speed regulator 26 of previous or subsequent stands to vary the drive motor speed for looper position regulation.

Gauge control is provided by the roll force gauge control system 14 through screwdown position controls 34 located in this instance at stands S2–S6. The roll force system 14 is also used in part to control drive motor speed so as to keep the looper position regulation within its operating range. A screwdown preset and reset system 36 provides for manual screwdown control and also controls the original roll set and reset positions at all of the stands S1–S6. A radiation gauge 38 measures delivered strip thickness at a reference stand such as stand S6 to provide steady state gauge error correction relative to a fixed reference strip thickness through a gauge monitor system 40. The monitor system 40 is connected to the roll force gauge control system 14 of stands S2–S5 so as to provide distributed correction loading of any required monitor gauge correction.

The improved gauge control previously described is realized by connecting a gauge control subsystem 42 of one or more stands so as to receive a gauge error signal derived from roll force at a previous master stand, and preferably the subsystem 42 is connected in slave relation to a gauge control subsystem 44 of a previous master stand so that at least part of any gauge error at the master stand is corrected at the slave stand. In this instance, stands S4 and S6 are slave stands while stands S3 and S5 are master stands. However, other master-slave combinations of stands can be employed. As already indicated, particular stands can be chosen as slave stands to realize special benefits.

Figure 2:
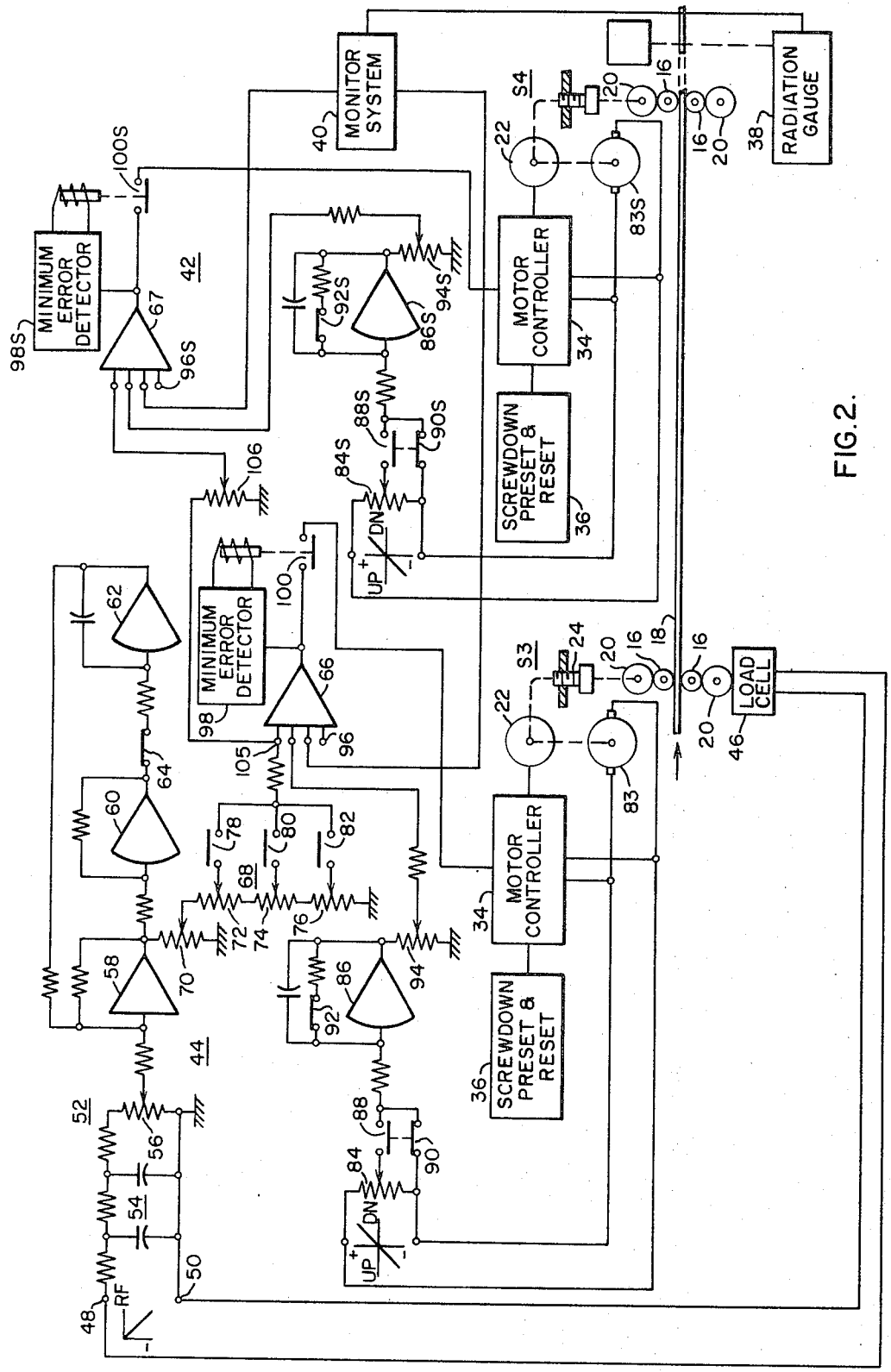
FIG. 2 shows a portion of FIG. 1 in greater schematic detail so as to indicate one manner in which one stand can be slaved to another stand in accordance with the present invention.

The master and slave subsystems 44 and 42 of stands S3 and S4 are shown in greater detail in FIG. 2. The master gauge control subsystem 44 includes a load cell 46 which operates as a transducer to produce a roll force signal at terminals 48 and 50 in accordance with the mill spring constant M. The roll force signal is passed in a feedback path 52 through a filter 54 and a gain adjustment potentiometer 56 to a roll force error detector 58. Preferably, the error detector output signal resulting from the initial roll force signal produced by entering strip is reversed in polarity and held constant at the error detector input by means of an inverter 60 and an integrator 62. The roll force input and the initial reference input are thereafter continuously added to produce an error output, corresponding to $MdF$ in the roll force equation, during the strip pass. When the strip 18 is fully rolled, a logic switch 64 is opened to reset the reference error detector input to zero. The roll force reference value can also be set by other means such as a manual potentiometer or a signal from a computer rather than the head and lock on means described.

In this case, the roll force error detector output is fed to a summing amplifier 66 through a gain adjustment network 68 including a potentiometer 70 and high, medium and low gain potentiometers 72, 74 and 76. A logic or manual switch 78, 80 or 82 is connected between each potentiometer 72, 74 or 76 and the summing amplifier 68 so as to determine the gain range within which the roll force error is being fed back for screw position control.

To produce the feedback screw position signal $dS$ for summation with the roll force error signal $MdF$ at the summing amplifier 66 in accordance with the roll force equation, a pilot generator 83, coupled to the screwdown motor 22, feeds a signal through a gain adjustment potentiometer 84 for integration over time by an integrator 86 as the screwdown motor is operated. Logic or manual switches 88, 90 and 92 provide for reset of the screw position integrator 86 after each strip pass.

The output from the integrator 86 is fed through another feedback gain adjustment potentiometer 94 to the input of the summing amplifier 66. To provide gauge error correction in response to error detection at the radiation gauge 38, the gauge monitor system 40 is connected to the summing amplifier 66 and summed against the screw position feedback signal. Additional signals can be transmitted to the summing amplifier 66 through one or more terminals 96 for special purposes. For example, a tail end system (not shown), an excess tension limit monitor system (not shown), and an acceleration monitor system (not shown) can all provide signals to the summing amplifier 66 so as to compensate for tail end gauge deviation and acceleration gauge deviation and so as to regulate any provided tension gauge control system within its range of effectiveness. Preferably, there is provided at the output of the summing amplifier 66 a minimum error detector 98 which controls a contact 100 so as to provide gauge error correction only above some minimum quantity of error, which defines a desired dead band of screwdown operation.

Output from the summing amplifier 66 represents a thickness error signal $(dh)$, and it is applied to the screwdown position control 34, for example a field controlled generator or a gate controlled thyristor circuit, so as to reposition the screws 24 for gauge correction. As already indicated, difficulty is encountered in adjusting the roll force error signal and the position signal gains to realize full correction of stand gauge error under varied operating conditions without gauge control instability or screw runaway.

Figure 3:
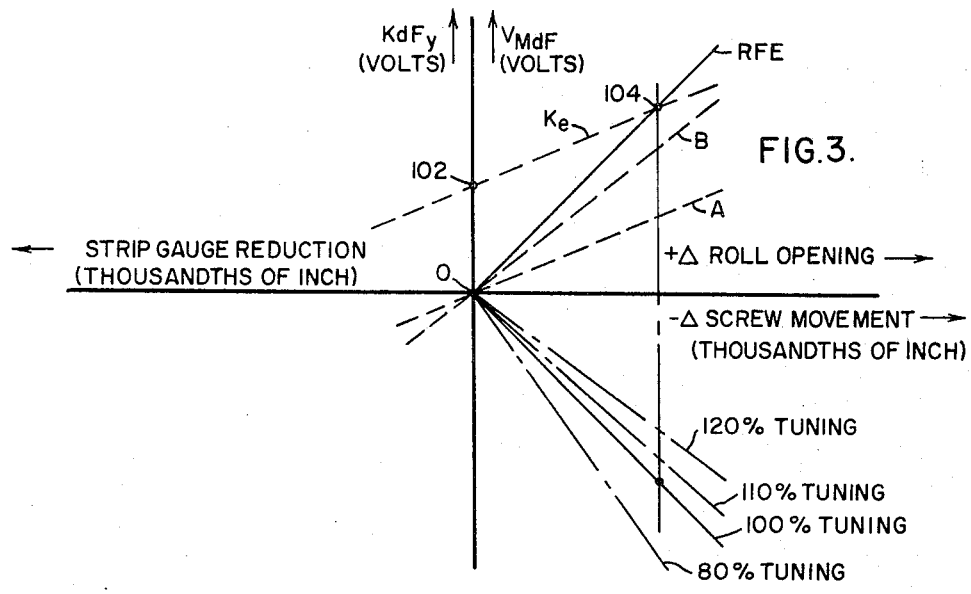
FIG. 3 provides a graphical illustration of the manner in which roll force gauge control generally operates electrically to control strip gauge.

The problem is perhaps better stated and understood by reference to the chart in FIG. 3 where the screw position signal, at four different tunings, is plotted in the downward ordinate direction as a function of change in screw position. The roll force error signal, RFE with idealizing assumptions, is plotted in the upward ordinate direction as a function of change in roll opening. Although the slope of the RFE curve need not be equal to the mill spring constant M, for the purpose of simplifying the explanation of FIG. 3 it is assumed that it is equal to M and that all gain adjustment or tuning is made by varying the slope of the position signal curve. In the subsystem 44 of FIG. 2, gain adjustment is primarily achieved by adjusting the slope of the RFE curve and to some extent the slope of the position signal curve.

The plastic deformation curve of strip reduced at the stand is also shown in the upward ordinate direction for two different materials having different metallurgical and hardness properties, for example assume curve A is for low carbon steel and curve B is for stainless steel. The curves A and B are generally based on typical force versus deformation or gauge reduction curves, and the units on the ordinate $KF_y$ are translated from force to voltage by a suitable constant K. It is also noted that the curves A and B are plotted with reference to an arbitrary desired gauge or roll opening at the origin O and with increasing plastic reduction in thickness in the leftward abscissa direction, i.e. in the decreasing roll opening direction.

Assume that strip A has entered the rolls and a positive gauge error appears so as to require a greater rolling force to bring the strip to correct gauge. A new yield curve $A_e$ corresponding to the new thickness thus exists, and it crosses the ordinate (at zero gauge error) as indicated by the reference character 102 (this point is also representative of the roll force voltage produced as a result of the change in roll force due to the gauge error).

In this case, the position signal increases along the 100% tuning curve to increase the screwdown position and, in turn, the roll force. As the roll force increases with screw movement, incremental screwdown is required to balance electrically the $MdF$ and the $dS$ signals to zero. The roll force increases along the RFE curve to point 104 where the curve $A_e$ intersects the curve RFE, i.e. where the force required to reduce the hot strip to desired thickness, point 102, is equal to the roll force which results in zero error voltage at the new screw position. Full correction to desired thickness is thus achieved. The roll force voltage at point 104 minus the roll force voltage at point 102 represents the voltage produced as a result of the change in roll force due to screw movement.

Strip B is similarly reduced in thickness if a gauge error occurs (not shown). However, its plasticity is closer to the elasticity of the mill and accordingly greater roll force is produced per unit of screw movement so as to result in equilibrium at a point (not shown) to the right and upwardly of the intersection point 104.

Now assume the same circumstances with the use of 80% tuning in the position feedback. Since the slope of the 80% tuning curve is greater in absolute units than that of the RFE curve, the roll force error voltage is balanced out by the position signal voltage with less screw movement and the gauge error is undercorrected. The opposite is true when the 110% tuning curve is used, that is overcorrection is achieved or an increasing opposite error is produced with screw runaway until the previously noted limit switch is actuated unless strip temperature rundown offsets the overcorrection effect. If the 120% tuning curve is used, screw movement is so great in relation to the corresponding rate at which the position signal increases, that the position signal rarely if ever balances against the roll force signal even with strip temperature rundown effects, and the screws run away until limit action is effected. Obviously, 100% to about 110% tuning is desirable and presumably achievable at least in the ideal case.

In practice, however, the spring constant M varies as previously described and accordingly the slope of the RFE curve varies as much as 10% under different rolling conditions. Further, the plastic deformation curve of the strip often has substantial variance from linearity in the working range of reduction. Thus, if 100% tuning is achieved under one set of mill operating conditions, it will not be achieved when the conditions have changed so as to result in a change in the slope of the RFE curve or a change in the strip intersection point on the RFE curve. For example, if the slope of the RFE curve increases or decreases, the effect on tuning is equivalent to moving from the 100% tuning curve to 120% tuning or to 80% tuning at a fixed RFE slope, respectively. Respective conditions of instability or screw runaway and gauge undercorrection result.

Without the slave scheme encompassed by the present invention, the safest but usually disadvantageous course to follow has been to undercorrect gauge error at any particular stand by roll force error feedback on a continuous basis, say at 80% tuning, as mill rolling conditions change. Variations in mill stand elasticity then produce either greater or less undercorrection but rarely result in instability or screw runaway. At best, if it is assumed the gauge error is not corrected by a later stand, the monitor system detects rolled gauge error and effects correction after some off gauge strip has been rolled.

In accordance with the present invention, the master stand gauge control subsystem preferably is set at a conservative gain tuning, for example 80%, and a slave error signal is transmitted to a subsequent slave stand in proportion (for example 20% or 30%) to the employed master operation error signal. Screw movement at the slave stand is thus controlled to aid in correcting gauge errors which appear at the master stand. Screw instability is eliminated at both stands and master stand gauge error correction can be fully achieved just as though single stand tuning had been used at the level of 100% to about 110% as the case may be.

Preferably, the slave stand relation is established by transmitting a portion of the master stand roll force error signal, as indicated at junction 105, to the input of summing amplifier 67 of the slave stand. The slave signal is thus summed with the slave screw position signal and any other input signals at the slave summing amplifier 67, and the resultant output signal controls the slave screw movement to achieve the desired slave gauge correction.

A potentiometer 106 can be used to define the signal fraction which is transmitted to the slave gauge control subsystem 42. Preferably, the roll force error feedback path (i.e., load cell, roll force error detector, etc.) is omitted from the slave gauge control subsystem 42 so as to subject it to full roll force slave control from the master stand.

The gauge monitor signal and the position control signal generated in the slave gauge control subsystem 42 are both fed into the slave summing amplifier 67 as in the case of the summing amplifier 66 at the master stand. Other special gauge correction signals can also be transmitted to the summer 67 in a manner similar to that previously described for the summer 66.

The fraction of the master roll force error signal which is used to determine the screw movement at the slave stand is preferably set to achieve full correction of any gauge error appearing at the master stand. Generally, a higher gain setting is required for the slave potentiometer 106 as the extent of undertuning is increased at the master stand. The slave signal can be set to achieve an effective master-slave gain tuning which compensates for strip temperature rundown between the master and slave stands and for temperature rundown between the slave stand and any subsequent stand which has no roll force gauge control subsystem. The particular gain level for the slave signal at any predetermined slave stand also depends on whether a plurality of stands are operated as slave stands from a previous master stand.

Figure 4:
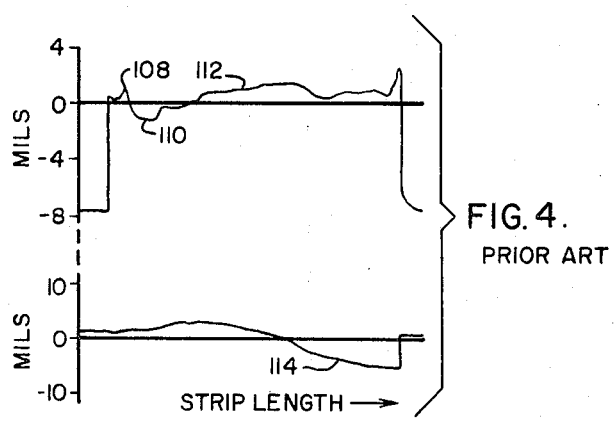
FIG. 4 shows gauge charts indicating system operation without the use of the present invention.

In FIG. 4, there are shown monitor and stand gauge charts taken from an actual strip pass through a conventional hot strip metal rolling mill. The zero level in both of the charts represents correct gauge. After strip entry, stand gauge correction resulted in an initial gauge overshoot 108 and a material reverse overshoot 110 followed by another overshoot 112. The monitor system in sensing the overshoot 112 finally developed a signal for monitor gauge error correction as indicated by the reference character 114. The gauge controllability represented in FIG. 4 is typical of conventional prior art systems, although it is sometimes much greater and sometimes less depending on use conditions.

Figure 5:
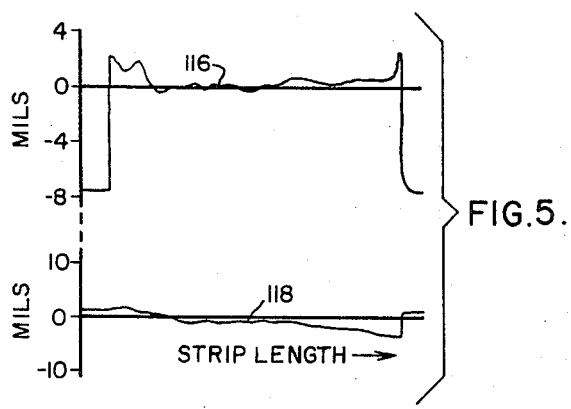
FIG. 5 shows gauge charts indicating system operation with the use of the present invention.

Improved gauge control accuracy is achieved with the incorporation of the present invention in the same typical mill as illustrated in FIG. 5. With the use of stand S4 as a slave to master stand S3, substantially improved stand gauge stability and accuracy was achieved as indicated by the reference character 116. The improved stand gauge accuracy resulted in less action by the gauge monitor system generally as indicated by the reference character 118.

In addition to improvement of gauge control stability, the master-slave gauge control system provides additional advantages. Generally, as observed in FIG. 5, gauge accuracy is simultaneously improved since any gauge undercorrection at the master stand is brought relatively stable and substantially to full correction at the slave stand, particularly if the slave stand is the next successive stand after the master stand. Rapid gauge errors such as skid marks are detected at the master stand and well corrected at the slave stand even if little or no correction occurred at the master stand (the strip transport time between the master and slave stands is usually within a suitable range to permit this result to be achieved).

Further, when successive stands are made master and slave, the master and slave screws ordinarily are simultaneously moved in the same rather than opposite directions which conventionally can be caused by overtuning the master stand to provide an anticipatory corrective factor for incoming gauge errors. With the operation of the last "major" reduction stand in the slave mode (in this case the last stand S6, but in other cases the last standing be a "shaping" stand and the next to the last stand is then the last major reduction stand, such as the fifth stand in a six stand mill or the sixth stand in a seven stand mill), there is provided material compensation for otherwise objectionable growback in the "last" stands, and the monitor system is thereby substantially relieved from performing this function with less departure from desired gauge in the delivered strip. By "major" reduction, it is meant to refer to a stand where reduction occurs materially in excess of the amount normally required to maintain minimum required roll friction to prevent slipping.

Another advantageous aspect of the present invention is the fact that existing rolling mills which have only a few of the stands provided with roll force gauge control can be substantially improved in operation with relatively small capital expenditure by connecting selected stands (presently without roll force gauge control) as slaves to existing roll force gauge control stands. Further, any existing stand which has roll force gauge control and which has had an operating history of instability can be improved in operation by removing its roll force feedbacks and slaving it to a previous stand.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A gauge control system for a rolling mill having at least two roll stands with each of the stands having variable position screws for controlling the respective stand roll openings, said system comprising a master roll force gauge control subsystem generating a gauge correction signal for controlling the screw position at one of the stands, a slave gauge control subsystem generating another gauge correction signal for controlling the screw position at a second stand, and means for transmitting to said slave subsystem at least a portion of a predetermined operation error signal provided by said master subsystem.

2. A gauge control system for a rolling mill having at least two roll stands with each of the stands having variable position screws for controlling the respective stand roll openings, said system comprising a master roll force gauge control subsystem generating a gauge correction signal for controlling the screw position at one of the stands, a slave gauge control subsystem generating another gauge correction signal for controlling the screw position at a second stand, said master subsystem including a roll force strip gauge error detector, for providing a roll force error signal and means for transmitting to said slave subsystem at least a portion of the roll force error signal provided by said master subsystem.

3. A gauge control system for a rolling mill having at least two roll stands with each of the stands having variable position screws for controlling the respective stand roll openings, said system comprising a master roll force gauge control subsystem including a master roll force strip gauge error detector for generating a roll force gauge error signal, said master subsystem including a screw position change detector, a summing amplifier connected to said detectors and producing an output gauge correction signal for controlling the screw position at one of the stands, a slave gauge control subsystem generating another gauge correction signal for controlling the screw position at a second stand, said slave subsystem including a screw position change detector, a slave summing amplifier connected to said slave screw position change detector, and means for transmitting at least a portion of the roll force error signal from said master roll force gauge error detector to said slave summing amplifier so as to control the screw position at the second stand.

4. A gauge control system as set forth in claim 3, wherein said transmitting means includes slave gain control means for varying the portion of the roll force error signal that is transmitted to the slave gauge control subsystem.

5. A gauge control system as set forth in claim 3, wherein a gauge monitor system is provided and is operative to sense the gauge of strip delivered from a reference stand of the mill, said monitor system including a radiation gauge for detecting delivery strip gauge error relative to the reference stand, said monitor system connected to provide a delivery gauge error signal at least for said slave summing amplifier.

6. A gauge control system for a rolling mill having a plurality of roll stands with each of the stands having variable position screws for controlling the respective stand roll openings, said system comprising a master roll force gauge control subsystem generating a gauge correction signal for controlling the screw position at one of the stands, a slave gauge control subsystem generating another gauge correction signal for controlling the screw position at the next subsequent stand, and means for transmitting to said slave subsystem at least a portion of a predetermined operation error signal provided by said master subsystem.

7. A gauge control system for a rolling mill having a plurality of roll stands with each of the stands having variable position screws for controlling the respective stand roll openings, said system comprising a master roll force gauge control subsystem generating a gauge correction signal for controlling the screw position at one of the stands, a slave gauge control subsystem generating another gauge correction signal for controlling the screw position at the next subsequent stand, said master subsystem including a roll force strip gauge error detector, for generating a roll force gauge error signal, and means for transmitting to said slave system at least a portion of the roll force error signal provided by said roll force gauge error detector.

8. A gauge control system for a rolling mill having a plurality of roll stands with each of the stands having variable position screws for controlling the respective stand roll openings, said system comprising a master roll force gauge control subsystem generating a gauge correction signal for controlling the screw position at one of the stands, a slave gauge control system generating another gauge correction signal for controlling the screw position at the next subsequent stand, said next subsequent stand being the last major reduction stand of the mill, and means for transmitting to said slave subsystem at least a portion of a predetermined operation error signal provided by said master subsystem.

9. A gauge control system for a rolling mill having a plurality of roll stands with each of the stands having variable position screws for controlling the respective stand roll openings, said system comprising a master roll force gauge control subsystem generating a gauge correction signal for controlling the screw position at the next to the last stand of said mill, a slave gauge control system generating another gauge correction signal for controlling the screw position at the last stand of said mill, and means for transmitting to said slave subsystem at least a portion of a predetermined operation error signal provided by said master subsystem.

10. A gauge control system as set forth in claim 8 wherein a master roll force gauge control subsystem is provided for at least one other stand previous to said one stand, a slave gauge control subsystem is provided at the next subsequent stand after said other stand, and means are provided for transmitting a predetermined operation error signal from said other stand master subsystem to its slave stand gauge control subsystem.

11. A gauge control system for a rolling mill having a plurality of roll stands with each of the stands having variable position screws for controlling the respective stand roll openings, said system comprising respective master roll force gauge control subsystems generating respective gauge error signals for respectively controlling the screw position at each of at least two of the stands, respective slave gauge control subsystems generating respective other gauge error signals for respectively controlling the screw position at each of at least another predetermined two of the stands, and means interconnecting said master and slave subsystems so as to produce gauge correction at the respective slave stands in response to predetermined operation error signals provided from the master stands.

12. A gauge control system for a strip rolling mill having a plurality of roll stands with each of the stands having variable position screws for controlling the respective stand roll openings, said system comprising a master roll force gauge control subsystem including a master roll force strip gauge error detector for generating a roll force gauge error signal, said master subsystem including a master screw position change detector, a summing amplifier connected to said detectors and producing an output gauge correction signal for controlling the screw position at one of the stands, a slave gauge control subsystem generating another gauge correction signal for controlling the screw position at the next subsequent stand, said slave subsystem including a screw position change detector, a slave summing amplifier connected to said slave screw position change detector, and means for transmitting at least a portion of the roll force gauge error signal from said master roll force gauge error detector to said slave summing amplifier so as to control the screw position at said next subsequent stand.

13. A gauge control system as set forth in claim 12 wherein a gauge monitor system is provided and is operative to sense the gauge of strip delivered from a reference stand of the mill, said monitor system including a radiation gauge for detecting delivery strip gauge error relative to the reference stand, said monitor system connected to provide a delivery gauge error signal for said slave and said master summing amplifiers.

14. A gauge control system for a tandem rolling mill having at least a prior roll stand and a subsequent roll stand with each of the stands having variable position screws for controlling the respective stand roll openings, said system comprising means for generating a signal dependent upon roll force at the prior stand in accordance with a predetermined relationship, a slave gauge control subsystem generating a gauge correction signal for controlling the screw position at the subsequent stand, and means for transmitting to said slave subsystem at least a portion of the roll force dependent signal generated at the prior stand.

References Cited
UNITED STATES PATENTS

| | | | |
|---|---|---|---|
| 3,111,046 | 11/1963 | Koss et al. | 72—8 |
| 3,169,421 | 2/1965 | Bloodworth | 72—11 |
| 3,186,200 | 6/1965 | Maxwell | 72—8 |
| 3,232,084 | 2/1966 | Sims | 72—16 |

RICHARD J. HERBST, *Primary Examiner.*

A. RUDERMAN, *Assistant Examiner.*